United States Patent [19]

Kowalski

[11] Patent Number: 5,067,863

[45] Date of Patent: Nov. 26, 1991

[54] CHANNEL NUT

[75] Inventor: Joseph W. Kowalski, Florissant, Mo.

[73] Assignee: B-Line Systems, Inc., Highland, Ill.

[21] Appl. No.: 622,754

[22] Filed: Dec. 5, 1990

Related U.S. Application Data

[63] Continuation of Ser. No. 479,347, Feb. 13, 1990, abandoned.

[51] Int. Cl.[5] ............................................. F16B 27/00
[52] U.S. Cl. ................................. 411/85; 411/112; 411/182; 411/432
[58] Field of Search ................. 411/84, 85, 103, 105, 411/108, 111–113, 104, 182, 177, 173, 552, 432

[56] References Cited

U.S. PATENT DOCUMENTS

| | | |
|---|---|---|
| Re. 17,870 | 11/1930 | Carr . |
| 1,466,176 | 8/1923 | Kraft . |
| 1,732,992 | 10/1929 | Spiro . |
| 2,314,509 | 3/1943 | Olson . |
| 2,383,141 | 8/1945 | Maage, Jr. . |
| 2,469,312 | 5/1949 | Poupitch . |
| 2,571,394 | 10/1951 | Trafton . |
| 2,649,126 | 8/1953 | Tinnerman . |
| 2,676,680 | 4/1954 | Kindorf ............................ 189/35 |
| 2,681,679 | 6/1954 | Poupitch ........................ 411/111 |
| 2,682,906 | 7/1954 | Poupitch . |
| 2,684,703 | 7/1954 | Crowther . |
| 2,705,991 | 4/1955 | Reiner . |
| 2,767,609 | 10/1956 | Cousino . |
| 2,767,951 | 10/1956 | Cousino ............................ 248/245 |
| 2,862,537 | 12/1958 | Poupitch . |
| 2,944,642 | 7/1960 | Evans ............................... 189/36 |
| 3,020,946 | 2/1962 | Mills . |
| 3,114,404 | 12/1963 | Fiddler . |
| 3,164,191 | 1/1965 | Grimm et al. . |
| 3,192,982 | 7/1965 | Rohe et al. . |
| 3,217,585 | 11/1965 | Munse . |
| 3,483,910 | 12/1969 | Londe et al. . |
| 3,493,025 | 2/1970 | Londe et al. . |
| 3,599,693 | 8/1971 | Bucheli . |
| 3,680,620 | 8/1972 | Gotschel et al. . |
| 3,783,922 | 1/1974 | Petrus . |
| 4,043,245 | 8/1977 | Kaplan . |
| 4,146,074 | 3/1979 | Kowalski ........................ 411/111 |
| 4,263,952 | 4/1981 | Kowalski ........................ 411/112 |
| 4,285,379 | 8/1981 | Kowalski ........................ 411/85 |
| 4,391,546 | 7/1983 | Lyon ................................ 403/189 |
| 4,410,298 | 10/1983 | Kowalski ........................ 411/112 |
| 4,460,299 | 7/1984 | Kowalski ........................ 411/85 |
| 4,486,133 | 12/1984 | Pletcher .......................... 411/84 |
| 4,488,844 | 12/1984 | Baubles ........................... 411/85 |
| 4,545,697 | 10/1985 | Verdenne et al. ............... 403/230 |
| 4,571,135 | 2/1986 | Martin et al. ................... 411/85 |
| 4,575,295 | 3/1986 | Rebentisch ..................... 411/85 |
| 4,645,393 | 2/1987 | Pletcher .......................... 411/84 |
| 4,666,355 | 5/1987 | Stover ............................. 411/85 |
| 4,695,212 | 9/1987 | Berecz ............................. 411/85 |
| 4,741,582 | 5/1988 | Peroni ........................... 312/257 SK |
| 4,758,124 | 7/1988 | Ingeberg ......................... 411/85 |
| 4,768,907 | 9/1988 | Gauron ........................... 411/85 |
| 4,784,552 | 11/1988 | Rebentisch ..................... 411/85 |
| 4,830,531 | 5/1989 | Condit et al. ................... 403/348 |
| 4,840,525 | 6/1989 | Rebentisch ..................... 411/85 |
| 4,863,327 | 9/1989 | Poupiter ......................... 411/112 |
| 4,895,484 | 1/1990 | Wilcox ............................ 411/85 |

Primary Examiner—Neill R. Wilson
Attorney, Agent, or Firm—Senniger, Powers, Leavitt & Roedel

[57] ABSTRACT

A fastener which can be economically made for securing parts to metal framing (e.g. channel framing) having side flanges with inwardly turned, hook-shaped lips defining a slot therebetween. The fastener comprises an elongate body having inside and outside faces, opposite sides and opposite ends, a width less than that of the slot and a length greater than the width of the slot. The fastener also includes a carrier constituting an elongate platform having inside and outside faces, opposite sides and opposite ends. The body is mounted on the outside face with means for rotatably mounting the body. The platform is suspended in the slot on resilient non-linear arms which increase in effective length when stressed by an effective inward force permitting the body to be rotated into generally crosswise position relative to the slot and tending to draw the body into clamping engagement with the lips of the framing.

11 Claims, 6 Drawing Sheets

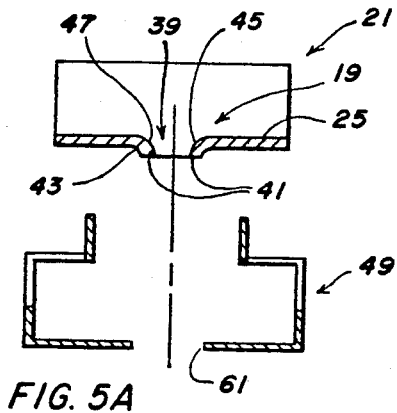
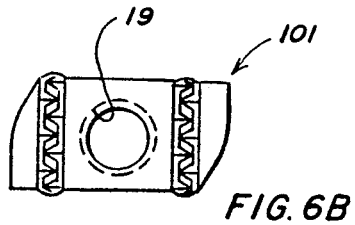
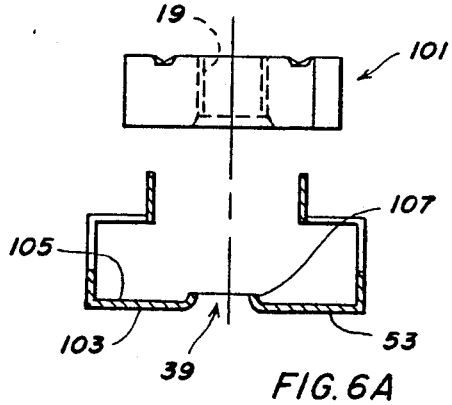
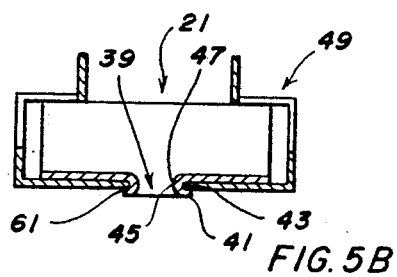
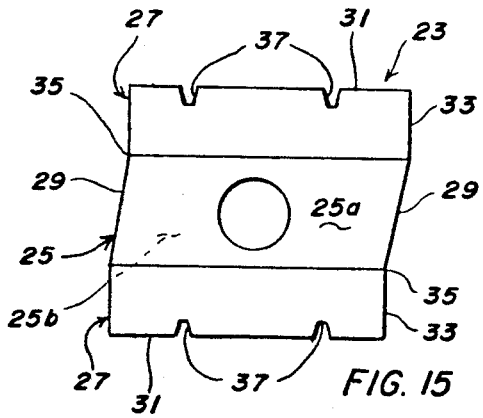
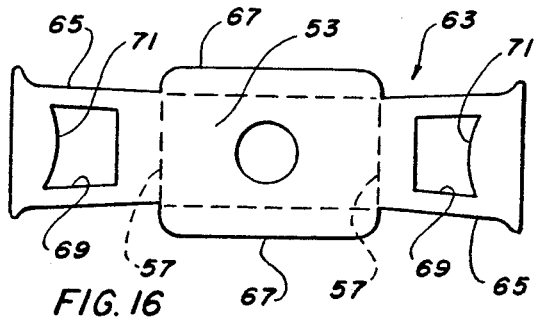
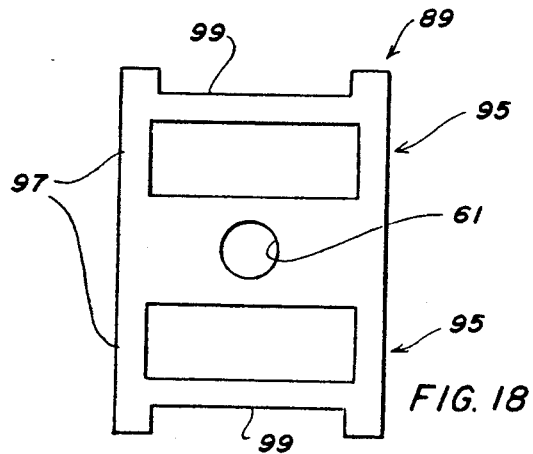
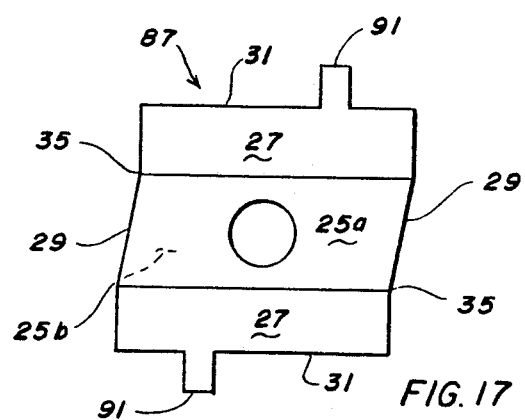

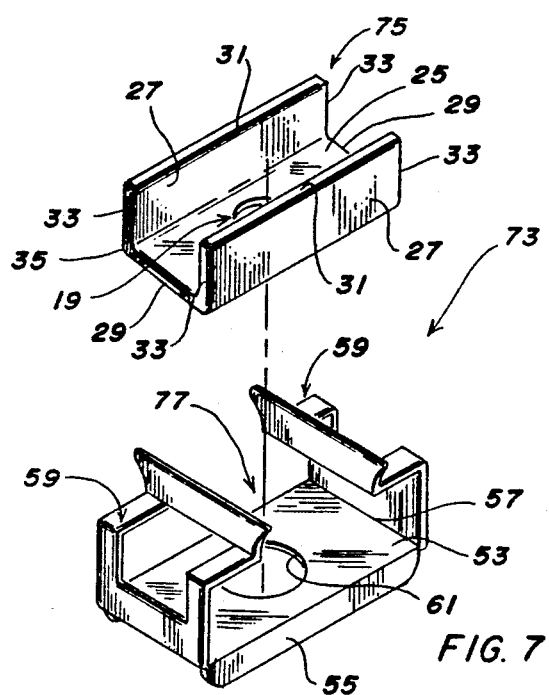
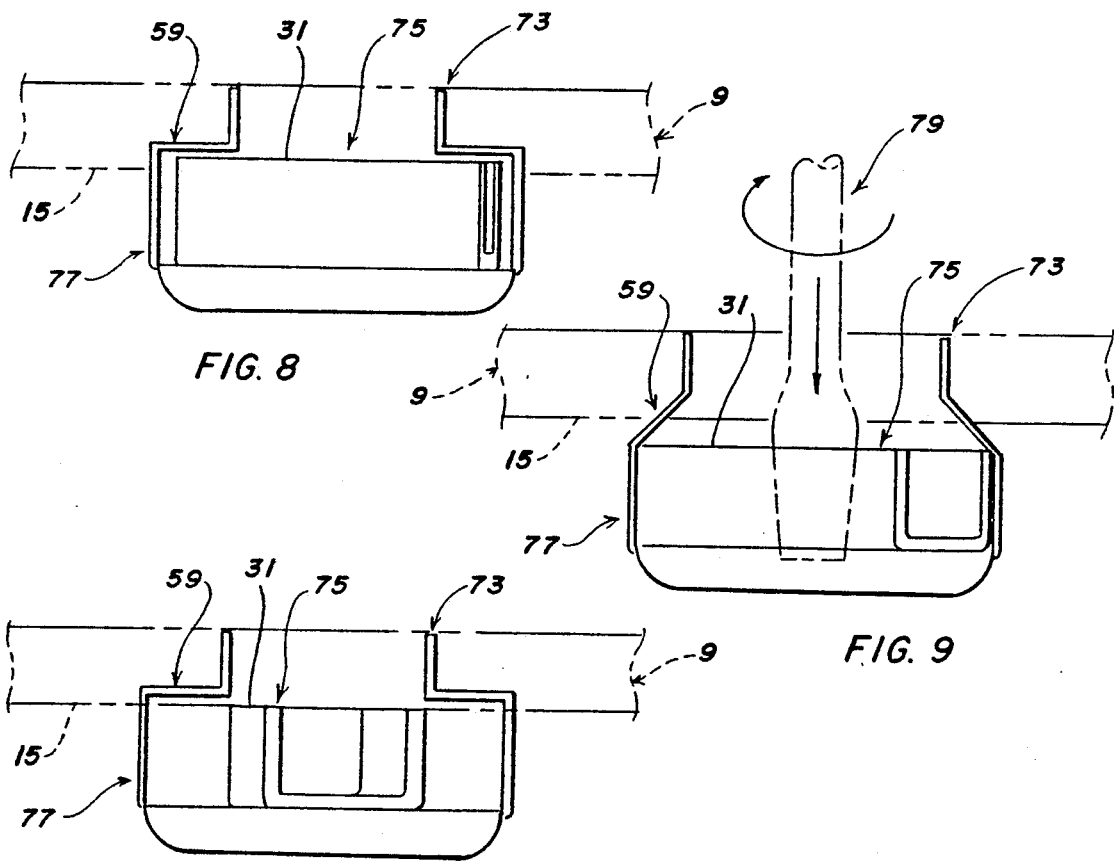

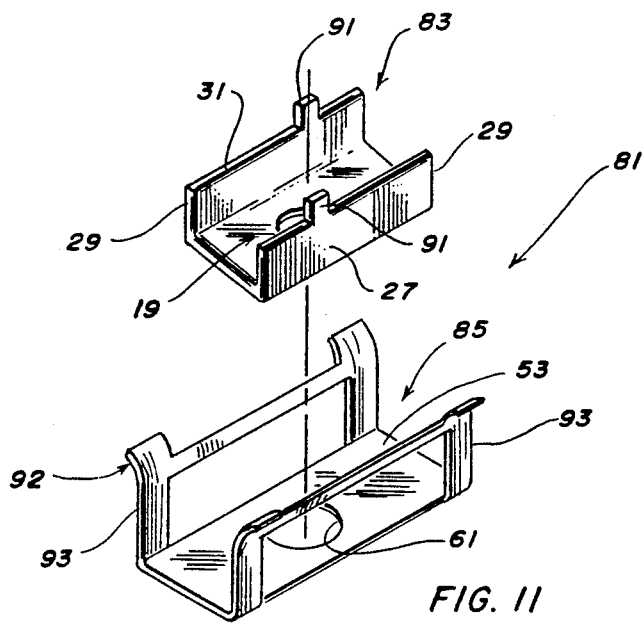
FIG. 11
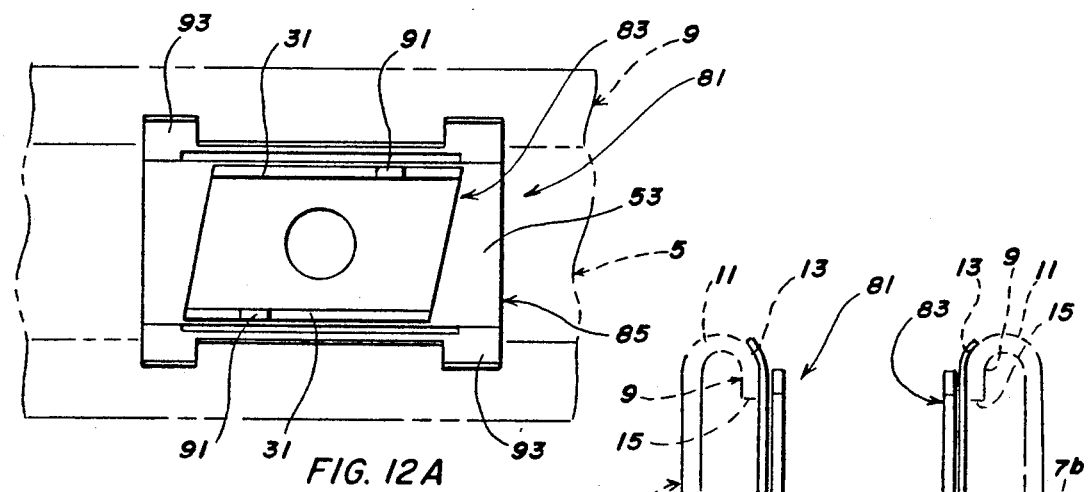
FIG. 12A
FIG. 12C
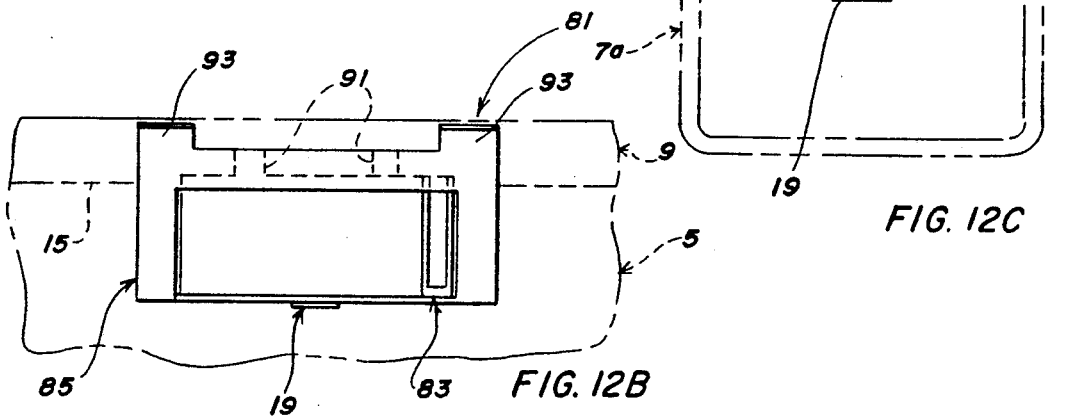
FIG. 12B

CHANNEL NUT

This is a continuation of application Ser. No. 07/479,347, filed Feb. 13, 1990, now abandoned.

BACKGROUND OF THE INVENTION

This invention relates to fasteners for fastening objects to metal channel framing wherein a nut is rotatably mounted in a cage which does not rotate with respect to the channel, said cage clamping the nut crosswise in the channel prior to and during securement of the object to the channel.

Metal framing is commonly used for electrical, mechanical and industrial supports such as for lighting fixtures, pipes and so forth. The framing is formed as a channel having side flanges with opposing, inwardly turned, hook shaped lips defining a slot therebetween. An elongated nut which is narrower and longer than the width of the slot is typically used for securing objects to the framing. As such, the nut is first aligned with the framing and passed through the slot and then turned crosswise with the nut engaging the lips of the channel. An object such as a bracket for a lighting fixture is then locked into position by means of a bolt extending through the object and threaded into a tapped hole in the nut.

A number of different means have been used for holding the nut in the channel in its crosswise position prior to and during securement of an object to the channel. One such means is a coil compression spring on the inside face of the nut which upon insertion of the nut in the slot reacts against the channel bottom and pushes against the channel lips. This arrangement has several serious disadvantages, one being that each channel of different depth requires a spring of correspondingly different length, thus greatly increasing the number of fastener sizes which have to be stocked. In addition, the nuts tend to tilt and topple over into the channel and it is difficult to use the channel as a raceway for wires and the like since the spring substantially blocks the entire channel.

Other prior art means for holding the nut against the channel do not block the channel but they have other drawbacks because they rotate with the nut and slip off the lips of the channel thus causing the nut to fall into the channel. Another problem is that the fasteners tend to be expensive. One example of such means is a coiled spring attached to the outside face of the nut for spanning the slot in the channel and pulling the nut into engagement with the channel lips.

Another means is a cradle for the nut having spring fingers on lugs extending outwardly from the outside face of the nut at opposite ends thereof. The lugs are engageable with the outside faces of the channel lips to pull the nut into engagement with the inside faces of the channel lips upon turning the nut to its crosswise position. The cradle, however, lacks means extending beyond the sides of the nut to prevent it from falling into the channel upon insertion of the nut into the slot.

The fasteners disclosed in U.S. Pat. Nos. 4,146,074, 4,410,298 and 4,460,299 rely upon clamps which rotate with the nut and can slip off the lips of the channel. In addition, the fastener described in U.S. Pat. No. 4,146,074 requires that the sides of the nut be slotted which dictates a separate machining step (e.g. a broaching step) with its attendant costs. The fastener disclosed in U.S. Pat. No. 4,285,379 eliminates the need to slot the nut but the fastener still can slip off the lips of the channel and is difficult to assemble increasing labor costs. The fastener disclosed in U.S. Pat. No. 4,410,298 has no slot but it requires the drilling of a pair of holes.

SUMMARY OF THE INVENTION

Among the several objects of this invention may be noted the provision of a fastener which does not slip off the lips of a channel wherein a nut can be turned crosswise in the channel from within a cage which does not rotate with the nut, said cage clamping the nut crosswise in the channel; the provision of a fastener with parts which are economical to produce and assemble; the provision of such a fastener which provides a clear channel for carrying an increased number of conductors; and, the provision of such a fastener which fits a wide range of channel depths, thus reducing the number of fastener sizes which need to be stocked.

Briefly, an improved fastener of this invention, which is useful for securing an object or a part to metal framing having a slot and inside and outside faces on opposite sides of the slot, comprises an elongate body having an inside and outside face, opposite sides and opposite ends. The width of the body is less than that of the slot in the framing whereby the body may be generally aligned with the slot, entered into the slot and passed through the slot from the outside to the inside of the framing and then turned to extend in generally crosswise position for engagement of portions of the outside face of the body adjacent the ends of the body with the inside face of the framing at opposite sides of the slot. The fastener further includes means for clamping the body in place in its crosswise position comprising a carrier constituting an elongate platform having a first face constituting an inside face and an opposite face constituting an outside face, opposite sides and opposite ends. Means for rotatably mounting the body are provided on the platform such that the body is rotatable crosswise in the metal framing. The width of the platform is less than the width of the slot in the framing so that the platform with the body generally aligned thereon may be generally aligned with the slot, entered into the slot and passed through the slot from the outside to the inside of the framing. The platform is suspended between a pair of resilient non-linear arms which bridge the slot and engage the outside faces of the framing. The non-linear arms, when unstressed, support the body on the platform such that the outside face of the body is at a level outward of the inside face of the framing. The non-linear arms, when stressed by an effective force applied to the outside face of the body, increase in effective length and support the body on the platform at a level with respect to the inside faces of the framing such that the body can be rotated into generally crosswise position relative to the slot with opposite ends of the body under the inside faces. The stressed arms provide a spring action tending to draw the body into clamping engagement with the inside faces on opposite sides of the slot.

Other objects and features will be in part apparent and in part pointed out hereinafter.

BRIEF DESCRIPTION OF THE DRAWINGS

FIG. 5A is an exploded view taken along line 5A—5A in FIG. 1 illustrating one means for rotatably mounting the body in the carrier;

FIG. 5B shows the body rotatably mounted in the carrier;

FIG. 6A is like FIG. 5A illustrating other means for rotatably mounting a body within a carrier in use with a solid steel threaded nut.

FIG. 6B is a top plan view of a solid steel threaded nut;

FIG. 7 is an exploded view of a second fastener of this invention which is a variant of the first fastener;

FIG. 8 is a side elevation of the fastener of FIG. 7 showing the body and carrier generally aligned with the slot;

FIG. 9 is a side elevation of the fastener of FIG. 7 showing the body partially rotated on the carrier less than a quarter of a turn;

FIG. 10 is a side elevation of the fastener of FIG. 7 showing the body rotated on the carrier into generally crosswise position relative the slot;

FIG. 11 an exploded view of a third fastener of this invention including a body and a carrier;

FIG. 12A a top plan view of the fastener of FIG. 11 showing the body and, carrier generally aligned with the slot;

FIG. 12B is a side elevation of the fastener of FIG. 12A;

FIG. 12C is an end elevation of the fastener of FIG. 12A;

FIG. 15 is a plan view of a sheet metal stamping adapted to be formed into the nut of the first fastener;

FIG. 16 is a plan view of a sheet metal stamping adapted to be formed,, into the carrier of the first fastener;

FIG. 17 is a plan view of a sheet metal stamping adapted to be formed into the nut of the third fastener; and, FIG. 18 a plan view of a sheet metal stamping adapted to be formed into the carrier of the third fastener.

Corresponding reference characters indicate corresponding parts throughout the several views of the drawings.

DESCRIPTION OF THE PREFERRED EMBODIMENTS

Figure 3A:
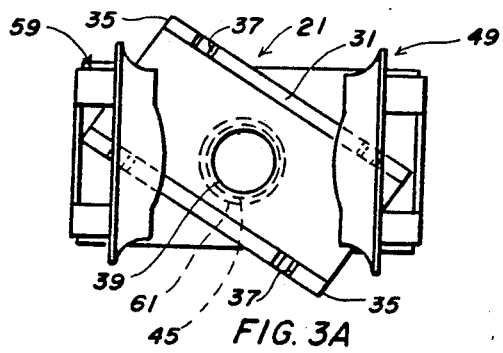
FIG. 3A is a top plan view of the fastener of FIG. 1 showing the body partially rotated on the carrier less than a quarter of a turn.
Figure 3C:
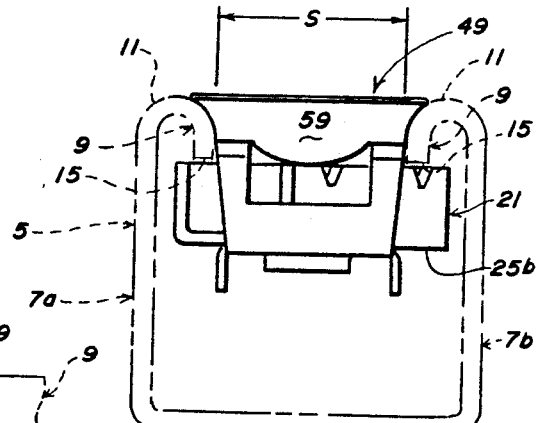
FIG. 3C an end elevation of the fastener of FIG. 3A.
Figure 3B:
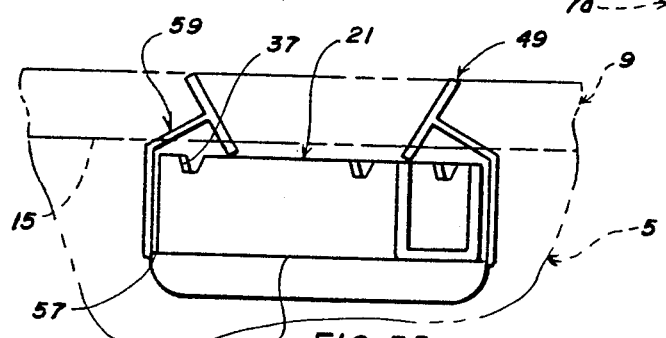
FIG. 3B is a side elevation of the fastener of FIG. 3A.
Figure 4A:
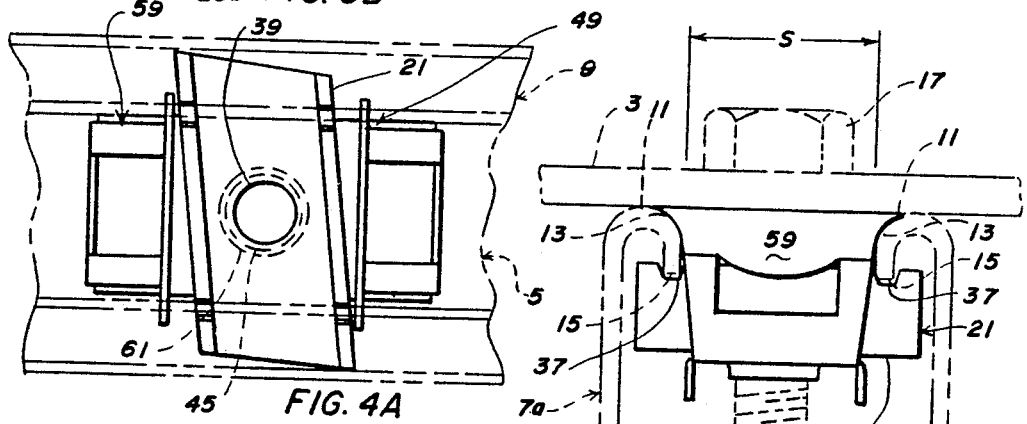
FIG. 4A is a top plan view of the fastener of FIG. 1 showing the body rotated on the carrier into generally crosswise position relative to the slot.
Figure 4C:
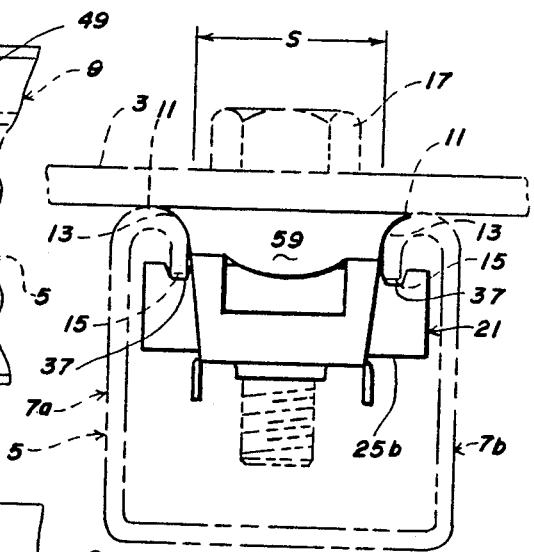
FIG. 4C is an end elevation of the fastener of FIG. 4A.

Referring now to FIGS. 1-5B, a fastener of this invention is indicated in its entirety at 1 and is shown in FIG. 4C securing a part 3 (such as a bracket) to a metal channel framing or support 5. The channel has a pair of side flanges 7a, 7b, the outer ends of which have inwardly directed lips 11 formed thereon as indicated generally at 9. The lips are hook shaped, having outside faces 13 forming a surface against which part 3 is locked and terminating in inside edges of faces 15. The lips 11 are spaced from one another to define a slot S therebetween which extends the length of the channel. As illustrated, part 3 spans slot S and bears on portions 13 of the channel lips at opposite sides of the slot, the part being locked in position by means of a conventional bolt 17 extending through the part and threaded into a tapped hole 19 in fastener 1.

More particularly, the fastener comprises an elongate body or nut 21 which can be economically made from a flat stamping generally designed 23 in FIG. 15. The stamping is formed into a channel having a bottom 25, side flanges 27 and opposite ends 29. Flanges 27 have a top edge 31 and opposite ends 33. Bottom 25 has an outer (upper) face 25a and an inner (lower) face 25b. While the length of nut 21 is greater than the width of channel slot S (but less than the distance between channel side flanges 7a, 7b), the width of the nut is less than the width of the slot S so that the nut may be inserted in and installed on the channel in a manner to be hereinafter described. As illustrated, bottom 25 is preferably rhomboid with diagonally opposite corners offset as indicated at 35 for facilitating such installation. The nut has parallel grooves or notches 37 extending across the top edges 31 of flanges 27 adjacent the ends 33 thereof, the notches 37 in one flange being aligned with the notches in the other flange for receiving respective edges 15 of the channel 5 when the nut is installed on the channel. As illustrated, notches 37 are sloped opening outwardly from the bottom and are engageable with inside edges 15 of the channel lips to assure that the fastener remains in position on the channel (even a vertical channel) when installed. As best seen in FIG. 5A, tapped hole 19 is formed by punching a centrally located hole 39 through bottom 25 of the channel which extrudes a ring of metal forming a collar 41 with an inside face 43 and an outside face 45. When hole 39 is punched through bottom 25 from outside face 25a towards inside face 25b, the punch forms a recess 47 on the outside face providing a lead in for bolt 17. Outside face 45 of collar 41 provides a surface into which threads can be formed while inside face 43 serves as a spindle as described below.

The fastener further includes a cage or carrier formed of a resilient material such as tempered carbon 1050 or 1060 steel, plastic or the like generally indicated at 49 for clamping nut 21 in place when the fastener is installed on a channel. Cage 49 comprises an elongate platform 53 preferably reinforced with downwardly turned side flanges 55. Opposite ends 57 are suspended on non-linear arms 59 which bridge the channel slot S and engage curved outside faces 13 of the channel lips to avoid interfering with locking part 3. Platform 53 has a width slightly less than the width of channel slot S so that it may be inserted in the slot and it has a length such that nut 21 can be mounted lengthwise on the platform and rotated as described below. As best seen in FIG. 5B, a means for rotatably mounting nut 21 on platform 53 comprises a hole 61 in platform 53 through which collar 41 of nut 21 can be passed. The inside face 43 of collar 41 serves as a spindle for rotation of the nut in hole 61 and, if peened over, forms an attachment between the nut and the carrier.

When carrier 49 is made from 1050 or 1060 steel, it can be economically made from a flat stamping generally designated 63 in FIG. 16. Stamping 63 has a pair of projections 65 extending from ends 57 of the section forming platform 53 and a pair of shorter projections 67 extending from the sides thereof. Each of projections 65 includes an aperture 69 with an arcuate side as indicated at 71. When projections 65 are bent upwardly and inwardly into a generally Z-shape in cross section, projections 65 form non-linear arms 59 and when projections 67 are bent downwardly, projections 67 form side flanges 55. After flat stamping 63 is bent into shape, the carrier is heat treated and then black guarded to prevent rusting.

To install fastener 1 on the channel 5, the nut is aligned with platform 53 and the platform is passed through slot S from the outside to the inside thereof until angular arms 59 engage curved outside faces 13 of the channel lips. The nut is then rotated from within carrier 49 through slightly less than a quarter of a turn to the right (i.e., clockwise as viewed from above slot S) to a position in which the nut extends at a slight angle to crosswise with respect to slot S. Offsets 35 which are the result of the rhomboid shape of bottom 25 facilitate rotation of the nut to this crosswise position, further rotation being prevented by the other corners of the nut. The rhomboid shape provides a long area of contact between notches 37 and inside edges 15 which assists the nut against slippage along the channel and against turning as bolt 17 is tightened.

Figure 1:
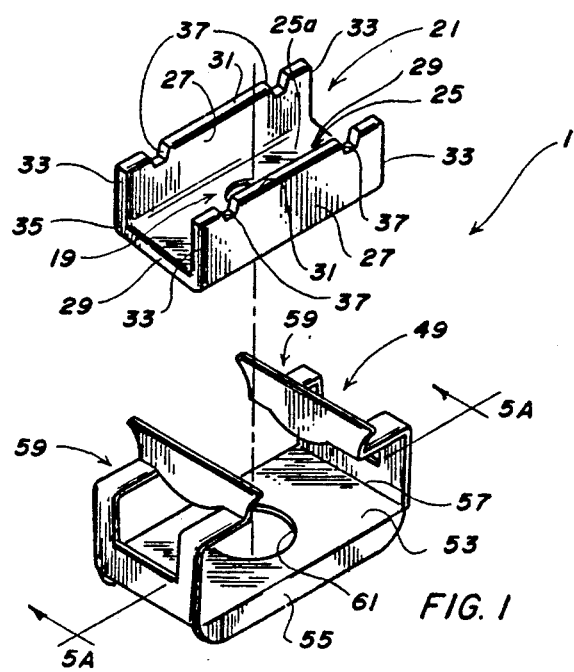
FIG. 1 is an exploded view of a first fastener of this invention including a body and a carrier.
Figure 2A:
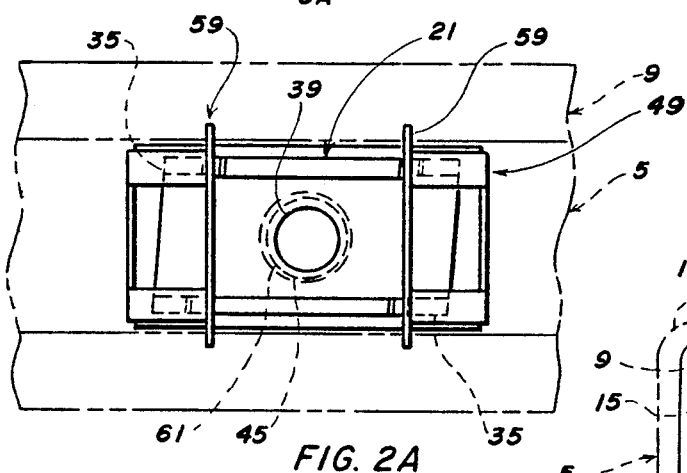
FIG. 2A is a top plan view of the fastener of FIG. 1 showing the body and carrier generally aligned with a slot in a channel.
Figure 2C:
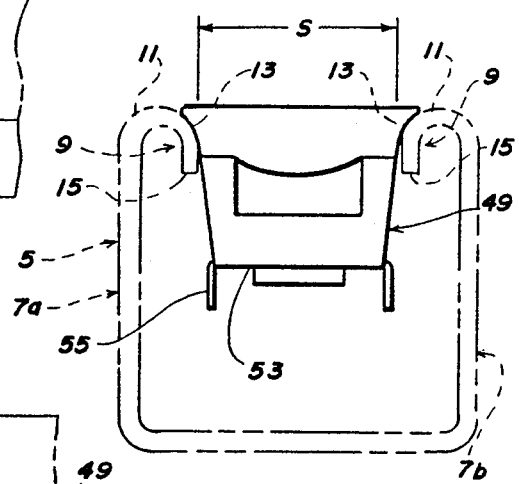
FIG. 2C is an end elevation of the fastener of FIG. 2A.
Figure 2B:
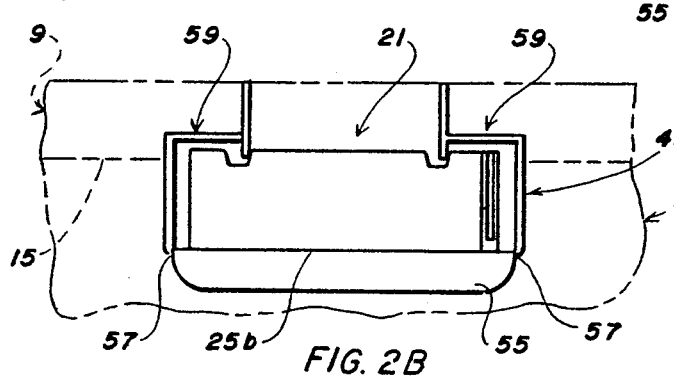
FIG 2B is a side elevation of the fastener of FIG. 2A.
Figure 4B:
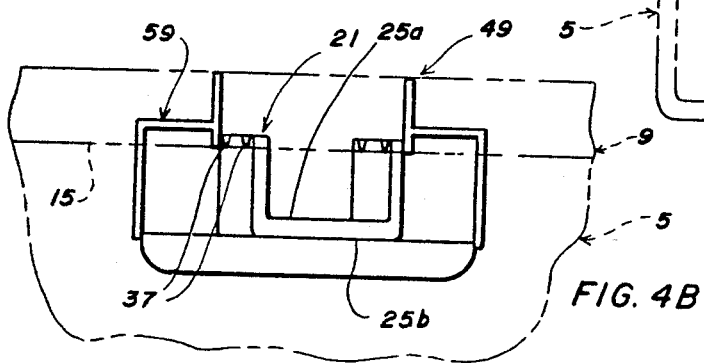
FIG. 4B is a side elevation of the fastener of FIG. 4A.
Figure 13A:
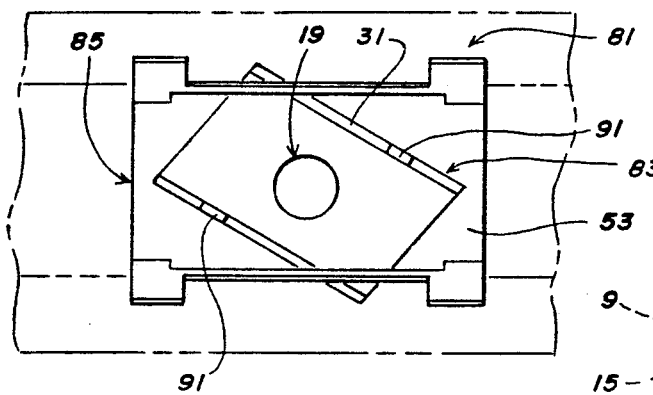
FIG. 13A is a top plan view of the fastener of FIG. 11 showing the body partially rotated on the carrier less than a quarter of a turn.
Figure 13C:
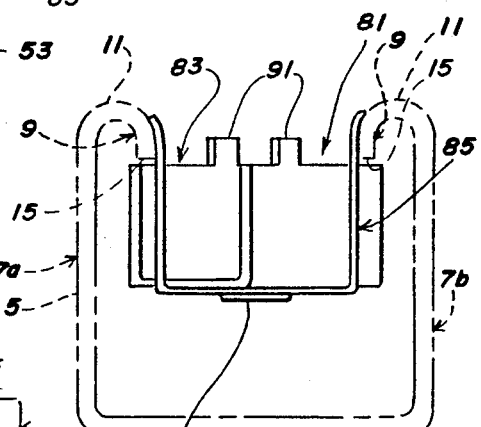
FIG. 13C is an end elevation of the fastener of FIG. 13A.
Figure 13B:
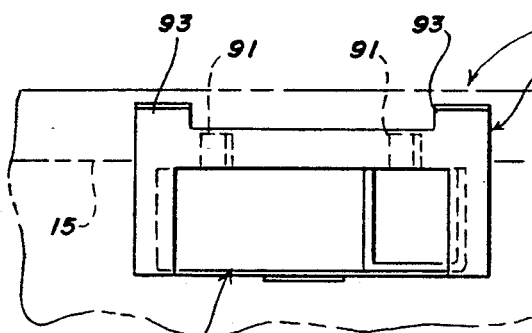
FIG. 13B is a side elevation of the fastener of FIG. 13A.
Figure 14A:
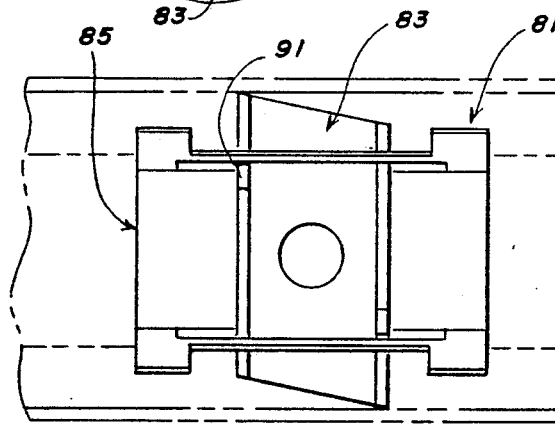
FIG. 14A is a top plan view of the fastener of FIG. 11 showing the body rotated on the carrier into generally crosswise position relative to the slot.
Figure 14C:
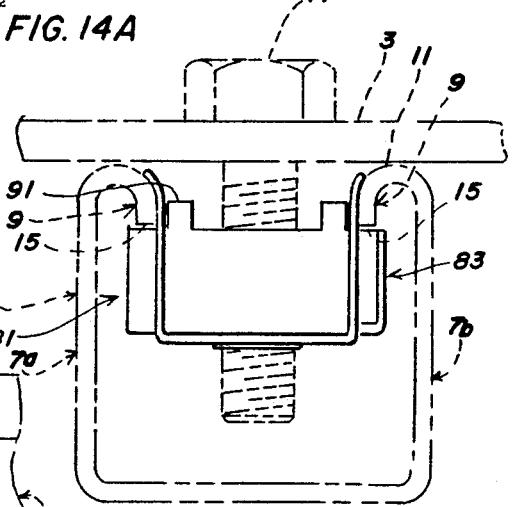
FIG. 14C an end elevation of the fastener of FIG. 14A.
Figure 14B:
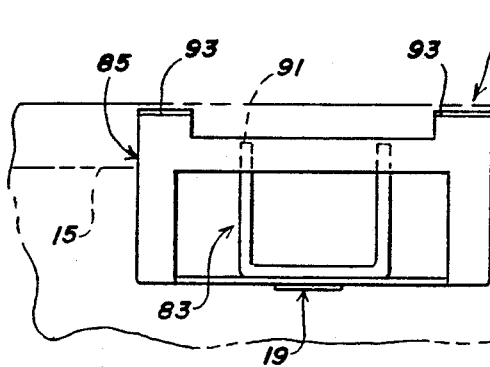
FIG. 14B is a side elevation of the fastener of FIG. 14A.

At the start of rotation as illustrated in FIGS. 2A-2C, arcuate surface 71 of aperture 69 is received in the inboard side of grooves 37. As illustrated in FIGS. 3A-3C when the nut starts to rotate, arcuate surface 71 cams out of notches 37 pressing inwardly on top edge 31 of side flanges 27 and applying an effective force on non-linear arms 59 such that there is a net opening of the arms. As non-linear arms 59 open, their effective length increases, lowering platform 53 such that nut 21 can rotate under inside edges 15 of the channel. Continued rotation of nut 21 causes arcuate surface 71 to slide along top edge 31 until nut 21 passes underneath. With continued rotation as shown in FIGS. 4A-4C, inside edges 15 are received in notches 37 and held therein by the spring action of non-linear arms 59.

A variant of the fastener shown in FIGS. 1-5B is shown in FIGS. 7-10. As illustrated, fastener 73 comprises a nut 75 and a carrier 77 which are similar to nut 21 and carrier 49 except that notches 37 and arcuate surface 71 are omitted. In this embodiment, the camming action of arcuate surface 71 is replaced by a inward force exerted by an operator by means of a slightly oversized screwdriver 79 jammed into tapped hole 19 or through some other suitable tool. This force opens the angle of the non-linear arms 59 and permits the nut to rotate under inside edges 15 into locked position.

Referring now to FIGS. 11-14C, a third embodiment of this invention is indicated in its entirety at 81. Like fastener 1, a nut 83 is rotatable from within a stationary cage 85. The nut 83 and cage 85 are preferably made from a flat stamping generally indicated at 87 and 89, respectively, in FIGS. 17 and 18. In most respects, nut 83 is like nut 21 except that notches 37 are omitted and ears 91 are formed on top edge 31 of side flanges 27 near opposite ends 29.

Cage 85 is dimensioned like cage 49 and comprises an elongate platform 53 with hole 61 in the bottom. Platform 53 is suspended on non-linear arms 92 comprising upwardly and outwardly curved side flanges 93 which engage the curved outside faces 13 of the channel lips. Flanges 93 are formed in stamping 89 as a pair of H-shaped projections 95 with legs 97 attached to the sides of the platform. A crossbar 99 connects legs 97 and is spaced away from the platform a distance such that nut 83 can rotate under crossbar 99 but is stopped by ears 91.

Fastener 81 is installed on channel 5 and operates in a manner comparable to fastener 73. When an operator applies an effective force to the outside face of nut 83, there is a net opening of curved side flanges 93. As side flanges 93 open, the effective length of flanges 93 is increased, lowering platform 53 such that nut 83 can rotate under inside edges 15 of the channel. At that point where further rotation of nut 83 is stopped by diagonal corners of bottom 25 opposite offsets 35, ears 91 contact crossbar 99 giving rigidity to the fastener between flanges 93 and preventing fastener 81 from slipping off the lips of the channel 5.

Except for FIG. 6, the nuts (21, 75 and 83) are illustrated as stamped sheet metal nuts. It will be appreciated that cage 49, 77 and 85 can be used with any threaded nut such as for example a solid steel threaded nut 101 of the type currently in generally use for bolted framing fasteners. In which case, means for rotatably mounting nut 101 are provided, for example, by forming hole 39 in the platform 53 by punching in a direction from an inside (lower) face 103 towards an outside (upper) face 105 extruding a collar 107 for use as a spindle in tapped hole 19. A fastener in accordance with the present invention therefore includes a cage such as 49, 77 and 85 in combination with such a nut.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed is:

1. For securement to metal framing having a slot and inside and outside faces on opposite sides of the slot for attachment of parts to the framing through the slot from the outside of the slot, a fastening comprising:

an elongate body having a first face constituting an inside face and an opposite face constituting an outside face, opposite sides, and opposite ends, the width of said body between said sides being less than the width of the slot in the framing whereby the body may be generally aligned with the slot, entered into the slot and passed through the slot from the outside to the inside of the framing and then turned to extend in generally crosswise position relative to the slot for engagement of portions of the outside face of the body adjacent the ends of the body with the inside faces of the framing at opposite sides of the slot; and means for clamping the body in its said crosswise position comprising a carrier including an elongate platform having a first face constituting an inside face and an opposite face constituting an outside face with means for rotatably mounting the body on the outside face of the platform, opposite sides, and opposite ends, the width of said platform between said sides being less than the width of the slot in the framing whereby the platform with the body generally aligned with the platform may be generally aligned with the slot, entered into the slot and passed through the slot from the outside to the inside of the framing, the length of said platform between said ends being sufficient to permit the body to rotate on the platform, said platform being suspended o a pair of resilient non-linear arms which are adapted to bridge the slot and engage the outside faces of the framing, said non-linear arms, when unstressed, being adapted to support the body on the platform such that the outside face of the body is at a level outward of the inside faces of the framing and, when stressed by an effective inward force applied to the outside face of the body, being adapted to increase in effective length and support the body on the platform at a level with respect to the inside faces of the framing such that the opposite ends of the body can be rotated into generally crosswise position relative to the slot, said stressed non-linear arms providing a spring action tending to draw the body into clamping engagement with the inside faces of the framing on opposite sides of the slot.

2. A fasting as set forth in claim 1 wherein the non-linear arms of the carrier are angular in shape and attached to the platform at opposite ends of the platform.

3. A fastening as set forth in claim 1 wherein the non-linear arms are arcuate in shape and attached to the platform at opposite sides of the platform, at least one of said non-linear arms having an aperture through which the body can pass when it is rotated on the platform.

4. For securement to metal framing having a slot and inside and outside faces on opposite sides of the slot for attachment of parts to the framing through the slot from the outside of the slot, a fastening comprising:

an elongate body formed as a channel having a rhomboid bottom, opposite sides and opposite ends with side flanges formed along the opposite sides, each side flange having an outer edge and said bottom having a first face constituting the inside face of the body and an opposite face constituting an outside face, said outer edges of the side flanges and the outside face of the bottom forming the outside face of the elongate body, the width of said body between said sides being less than the width of the slot in the framing whereby the body may be generally aligned with the slot, entered into the slot and passed through the slot from the outside to the inside of the framing and then turned to extend in generally crosswise positions relative to the slot for engagement of portions of the outside face of the body adjacent to ends of the body with the inside feces of the framing at opposite sides of the slot; and means for clamping the body in tis said crosswise position comprising a carrier including an elongate platform having a first face constituting an inside face and an opposite face constituting an outside face, opposite sides, and opposite ends, the outside face of the platform having means for rotatably mounting the body, the width of said platform between said sides being less than the width of the slot in the framing whereby the platform with the body generally aligned with the platform may be generally aligned with the slot, entered into the slot and passed through the slot from the outside to the inside of the framing, the length of said platform between said ends being sufficient to permit the body to rotate, said platform being suspended on a pair of resilient non-linear arms which are adapted to bridge the slot and engage the outside faces of the framing, said non-linear arms, when unstressed, being adapted to support the body on the platform such that the outside face of the body is at a level outward of the inside faces of the framing and, when stressed by an effective inward force applied to the outside face of the body, being adapted to increase in effective length and support the body on the platform at a level with respect to the inside faces of the framing such that the opposite ends of the body can be rotated into generally crosswise position relative to the slot, said stressed non-linear arms providing a spring action tending to draw the body into clamping engagement with the inside faces of the framing on opposite sides of the slot.

5. A fastening as set forth in claim 4 wherein the non-linear arms of the carrier are angular in shape and are attached to the platform at opposite ends of the platform.

6. A fastening as set forth in claim 5 wherein each side flange of the body has opposite ends and notches in its outer edge adjacent opposite ends of the side flange, the notches in one side flange being aligned with the notches in the other side flange for receiving respective inside faces of the framing when the body is rotated to said generally crosswise position.

7. A fastening as set forth in claim 6 wherein each angular arm of the carrier includes an aperture defined in part by an arcuate side edge which is received in respective notches in the side flanges of the body when the angular arms are unstressed and the body is generally aligned with the platform of the carrier, said arcuate side edges being engageable with the side flanges when the body is rotated to its said generally crosswise position for applying an inward force to the outside face of the body and stressing the angular arms of the carrier.

8. A fastening as set forth in claim 4 wherein the non-linear arms are arcuate in cross section and are attached to the platform at opposite sides of the platform, said non-linear arms having apertures through which opposite ends of the body can pass when it is rotated on the platform to said generally crosswise position.

9. A fastening as set forth in claim 8 wherein the outer edge of a side flange of the body has an ear adjacent an end thereof engageable with a respective arcuate arm to prevent rotation of the body beyond its said generally cross-wise position relative to the slot, thereby giving rigidity to the carrier and preventing it from slipping off the inside faces of the framing.

10. For securement to metal framing having a slot and inside and outside faces on opposite sides of the slot for attachment of parts to the framing through the slot from the outside of the slot, a fastening comprising:

an elongate body having a first face constituting an inside face and an opposite face constituting an outside face, opposite sides, and opposite ends, the width of said body between said sides being less than the width of the slot in the framing whereby the body may be generally aligned with slot, entered into the slot and passed through the slot from the outside to the inside of the framing and then turned to extend in generally crosswise position relative to the slot for engagement of portions of the outside face of the body adjacent the ends of the body with the inside faces of the framing at opposite sides of the slot;

means for clamping the body in its said crosswise position comprising a carrier including a platform on the inside face of the body having a width less than the width of the slot whereby the platform and body may be aligned with the slot, entered into the slot and passed through the slot from the outside to the inside face of the framing, and bridging means adjacent the outside face of the body and connected to the platform, said bridging means being engageable with the outside face of the framing on opposite sides of the slot when the platform is passed through the slot for limiting the extent of passage of the platform inwardly beyond the slot, and means mounting said body on the platform for rotation relative to the platform to its said crosswise position after the platform has been passed through the slot, and spring means associated with the carrier for resiliently urging said body in its said crosswise position against the inside face of the framing thereby to clamp the body in fixed position relative to the framing.

11. A fastening as set forth in claim 10 wherein said spring means is formed as an integral part of the carrier.

* * * * *